United States Patent [19]

Hanlon

[11] 3,951,936
[45] Apr. 20, 1976

[54] POLYMERIZATION PROCESS
[75] Inventor: Thomas L. Hanlon, Akron, Ohio
[73] Assignee: The Goodyear Tire & Rubber Company, Akron, Ohio
[22] Filed: Sept. 3, 1974
[21] Appl. No.: 502,580

[52] U.S. Cl. .............................. 526/116; 252/429 B; 260/154; 260/160; 260/169; 260/338; 260/345
[51] Int. Cl.² ...................... C08F 4/66; C08F 36/08
[58] Field of Search .................................... 260/94.3

[56] References Cited
UNITED STATES PATENTS
3,547,864  12/1970  Lasis ................................. 260/94.3
3,585,178  6/1971  Kasai et al. ........................ 260/94.3

Primary Examiner—Edward J. Smith
Attorney, Agent, or Firm—F. W. Brunner; J. Y. Clowney

[57] ABSTRACT

A method of preparing synthetic rubbers wherein the monomer plus vinyl chloride is contacted with a catalyst normally imparting a high trans-1,4 configuration to the polymer, resulting in a mixture of cis-1,4 and trans-1,4 homopolymers.

4 Claims, No Drawings

POLYMERIZATION PROCESS

This invention is directed to a process which produces synthetic rubbers.

It is known that isoprene can be polymerized to form synthetic rubber of variable structure. The best known and commercially most important is a polyisoprene of high cis-1,4 structure. This polyisoprene resembles natural rubber in most of its properties and has found wide industrial application in areas where natural rubber is used. However, it has been found that the presently known synthetic high (>90%) cis-1,4-polyisoprenes have some deficiencies when compared to natural rubber. For instance, natural rubber is well known to have excellent green strength. "Green strength" is the property wherein unvulcanized but compounded rubber has sufficient tenacity that it can be handled without the tendency to rupture or tear when being utilized to build or to fabricate rubber articles, such as tires and the like. On the other hand, high cis-1,4-polyisoprene which is being produced in large quantities at this time, does not have sufficient green strength to make it quite as versatile as natural rubber. For instance, unvulcanized compounded synthetic high cis-1,4-polyisoprene does have a tendency to tear or rupture while being handled in building tires. The same holds true for cis-1,4 -poly-2-ethyl-1,3-butadiene.

It is known that trans-1,4 structure improves the green strength of high cis-1,4-polyisoprene. The prior art is filled with instances of high trans-1,4 polymers produced by aluminum-vanadium type catalyst systems. Many of these prior art references teach different methods of preparing these catalysts as well as instances of modifying these catalyst systems. However, the instant patent application utilizes an unobvious and novel method of modifying a trans-1,4-producing catalyst system to form a different mixture of cis-1,4 and trans-1,4 polymer mixtures.

Thus, it is the object of this invention to provide a synthetic polyisoprene or poly-2-ethylbutadiene which has some of the trans-1,4 configuration polymer already mixed into it so that the green strength enhancer will already be present.

It is known that organic chloride compounds can function as chain transfer agents in Ziegler-Natta polymerizations, but the present invention provides a novel method of utilizing vinyl chloride in a polymerization system to produce cis-1,4 structure from a trans-1,4 producing catalyst system in order to get an unobvious mixture of polymer microstructure configurations.

According to the invention there has been discovered a method of preparing polyisoprene and poly-2-ethylbutadiene respectively from the monomers isoprene and 2-ethylbutadiene by contacting said monomers respectively with a trans-1,4 producing catalyst consisting essentially of (1) an organo aluminum compound, (2) a titanium halide, and (3) a vanadium halide together with vinyl chloride in a polymerization mixture to produce a mixture of the above respective polymers to contain a mixture of cis-1,4 and trans-1,4 configurations, wherein the trans-1,4 content is less than 95 percent, and simultaneously increasing the cis-1,4 content.

The trans-producing catalysts used in this invention are ternary systems based on organoaluminum compounds in combination with mixtures of vanadium halides and titanium halides, as for example, vanadium and titanium tetrachlorides. The mole ratio of organoaluminum compounds/vanadium halide compounds/titanium halide compounds should be maintained at about 3/1/1 to about 10/1/1. These ternary catalyst systems are known in the prior art and many variations of mole ratios are available to those skilled in the art.

The organoaluminum compounds are usually based on trialkyl aluminum compounds. The alkyl groups in the aluminum trialkyl may be straight chain or branched and contain from 2 to about 10 carbon atoms. Representative examples of trialkyl aluminum compounds are triethylaluminum, tri-n-propylaluminum, triisobutylaluminum, tri-n-hexylaluminum, tri-n-decylaluminum, tri-isopropylaluminum and the like.

An interesting aspect of this invention is that all organic chlorine containing compounds do not exhibit the same effect on the catalyst system utilized in the present invention. For instance, compounds having the structure R-Cl, where R is a n-alkyl group, do not have any effect on the structure of the resulting polymer. Compounds having the structure known as the allyl group (R-C=C-C-Cl) tend to poison the catalyst activity.

One of the features of this invention which makes it unique is that the resulting polymers made by this process are mixtures of cis-1,4 oriented homopolymers and trans-1,4 oriented homopolymers rather than what is known as stereo-block polymers. "Stereo-block" polymers are featured by the oppositely oriented structure of the polymer being chemically connected by a bond to the polymer chain. In this invention, the polymeric end product is predominately characterized by two separately characterized homopolymers mixed intimately together to give the desired amount of trans-1,4-configuration polymer so that it will not subsequently have to be added.

The polymerization is carried out in general at temperatures from −10°C. to 100°C., preferably between 20°C. and 80°C.

While bulk polymerizations can be conducted, in general, the polymerizations of this invention are carried out in any inert solvent, and are, thus, solution polymerizations. Such solvents are usually aliphatic, aromatic or cycloaliphatic hydrocarbons, examples of which are pentane, hexane, toluene, benzene, cyclohexane and the like. Also, continuous and batch polymerizatioon techniques may be utilized in the practice of this invention.

It is necessary to conduct the polymerizations of this invention employing the conventional air-free and moisture-free techniques.

The practice of this invention is further illustrated by reference to the following examples which are not intended to limit the scope of the invention in any manner.

EXAMPLE I

This example illustrates how vinyl chloride in the presence of a trans-1,4 catalyst affects the configuration of the resulting polymer.

Four-ounce polymerization bottles utilizing clean, dry techniques were used. To each of the polymerization bottles was added a solution containing 10 grams isoprene/80 milliliters benzene solution which had been passed through a silica gel column. Before catalyst addition, each bottle was sparged with nitrogen for 30 seconds and then different amounts of vinyl chloride were added as a benzene solution. The vinyl chloride/benzene solution (25 percent by weight vinyl chloride) was passed through silica gel prior to its use. The catalyst components were then added under a blanket of nitrogen. The catalyst used was a triethylaluminum (TEAL)/vanadium tetrachloride (VCl$_4$)/titanium tetrachloride (TiCl$_4$) catalyst which had been preformed at 95°C. The molar ratio of TEAL/VCl$_4$/TiCl$_4$ was 0.8/1.0/1. To each bottle was added 0.66 mls. of catalyst containing 1.32 mm. VCl$_4$, 1.32 mm. TiCl$_4$ and 1.06 mm. TEAL. The preformed catalyst was then modified in situ with TEAL to give a TEAL/VCl$_4$ molar ratio of 5.0 and final catalyst level of 0.132 mm. vanadium/10 gms. of isoprene. The polymerizations were run for 24 hours at 50°C.

Table I

| No. | Vinyl chloride/V (molar ratio) | % Cis-1,4 | % Trans-1,4 | Conversion % |
|---|---|---|---|---|
| 1 | 0 | 10 | 90* | 83 |
| 2 | 50 | 53 | 47 | 74 |
| 3 | 140 | 67 | 33 | 75 |
| 4 | 200 | 89 | 11 | 75 |
| 5 | 300 | 78 | 22 | 80 |

*These catalysts usually produce a trans-1,4 content of 95 percent or greater.

The mole ratio of the vinyl chloride to the vinyl halide is from about 1.0 to about 500.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a mixture of cis-1,4-polyisoprene and trans-1,4-polyisoprene polymers from isoprene with a trans producing catalyst system consisting essentially of (1) a trialkylaluminum, (2) a titanium halide, and (3) a vanadium halide, wherein the mole ratio of the trialkylaluminum/vanadium halide/titanium halide ranges from about 3/1/1 to about 10/1/1, together with vinyl chloride in the polymerization mixture in amounts to give a vinyl chloride to vanadium halide mole ratio of from about 1.0 to about 500, thereby forming a mixture of cis-1,4-polyisoprene and trans-1,4-polyisoprene polymers, which contain less than 95 percent trans-1,4-configuration.

2. The process according to claim 1 in which the trialkylaluminum contains from 2 to 10 carbon atoms.

3. A process of preparing a mixture of cis-1,4-poly-2-ethylbutadiene and trans-1,4-poly-2-ethylbutadiene polymers from 2-ethylbutadiene comprising contacting 2-ethylbutadiene with a trans producing catalyst consisting essentially of (1) a trialkylaluminum, (2) a titanium halide and (3) a vanadium halide, wherein the mole ratio of the trialkylaluminum/vanadium halide/titanium halide ranges from about 3/1/1 to about 10/1/1, together with vinyl chloride in the polymerization mixture in amounts to give a vinyl chloride/vanadium halide mole ratio ranging from about 1.0 to about 500, thereby forming a mixture of cis 1,4-poly-2-ethylbutadiene and trans-1,4-poly 2-ethylbutadiene polymers, which contain less than 95 percent trans-1,4-configuration.

4. The process according to claim 3 in which the trialkylaluminum contains from 2 to 10 carbon atoms.

* * * * *